Apr. 24, 1923.
C. M. MEAD
SAFETY SIGNAL FOR VEHICLES
Filed May 17, 1921.  2 Sheets-Sheet 2
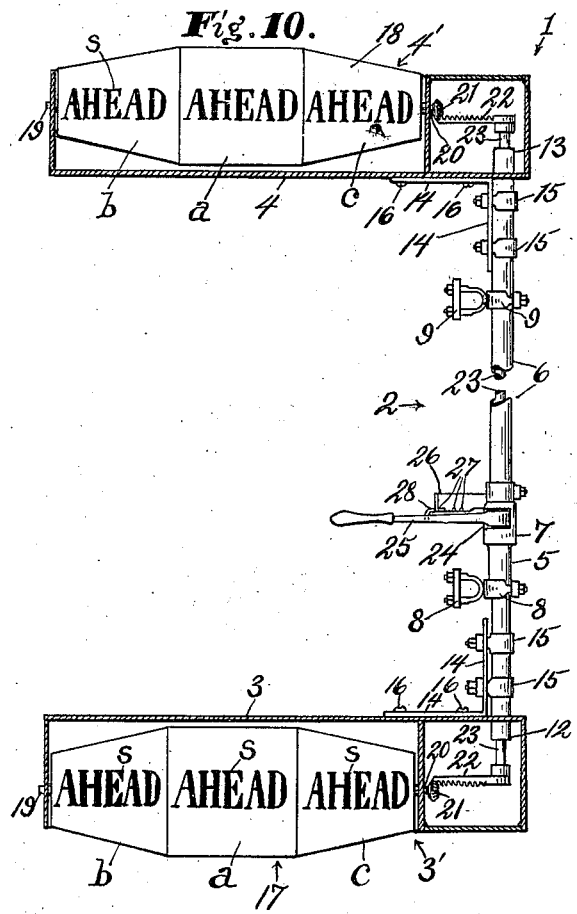
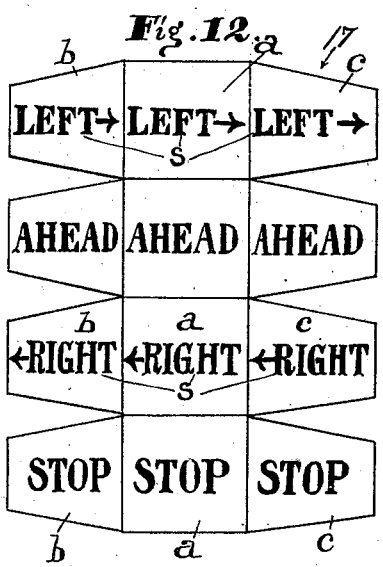
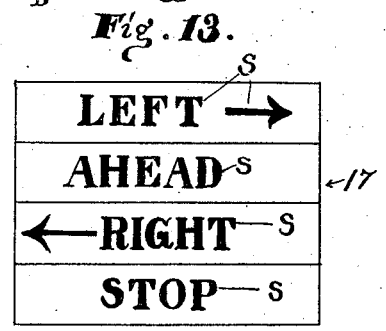
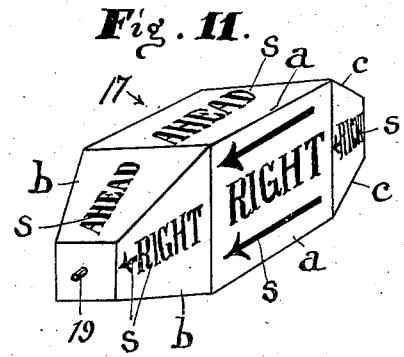
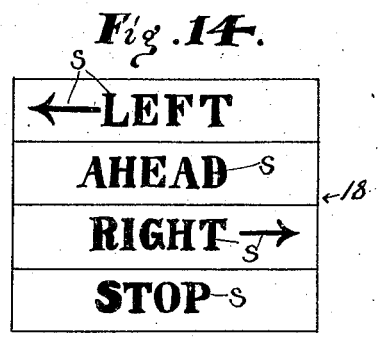
Inventor.
Charles M. Mead.

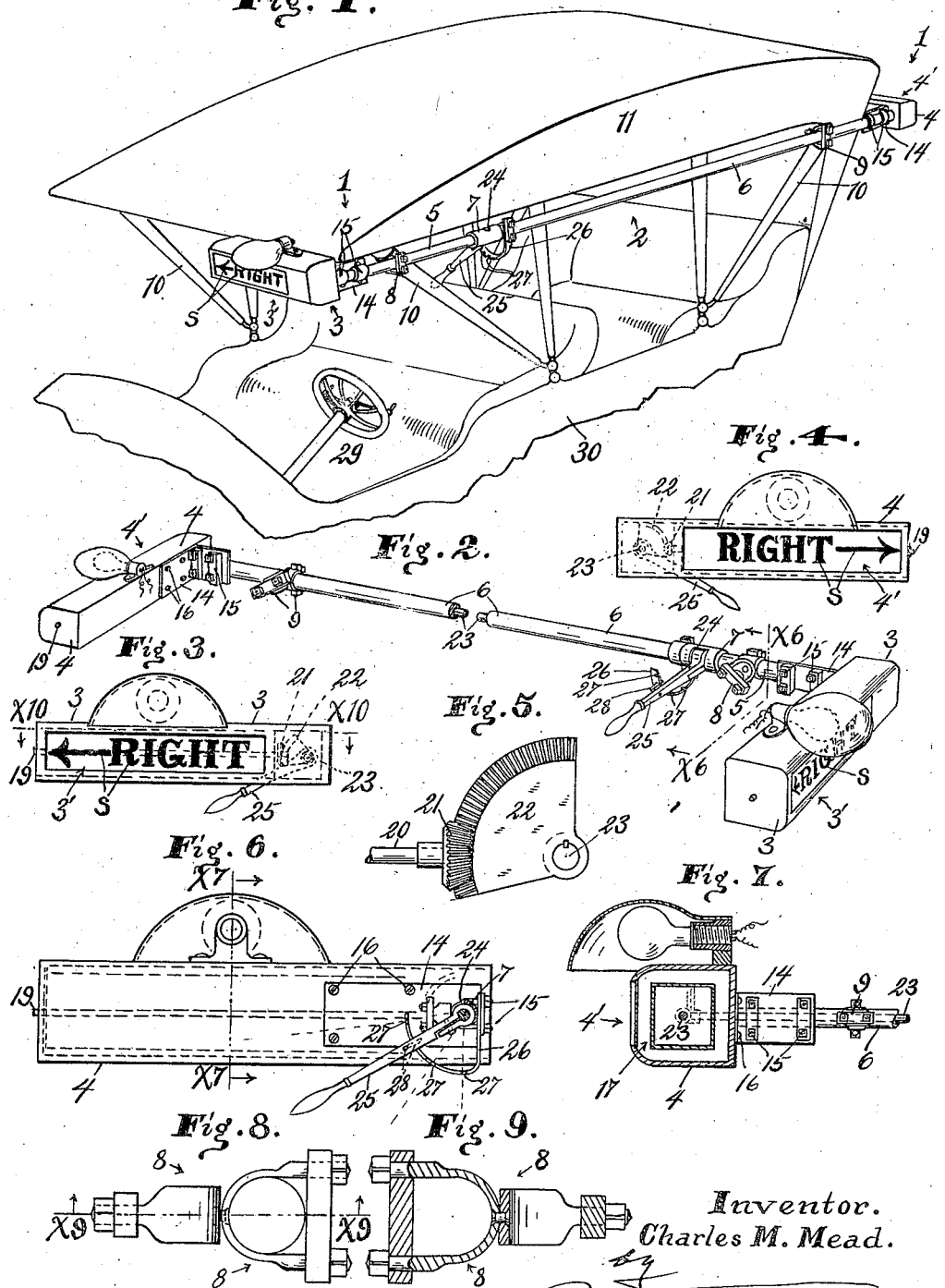

Patented Apr. 24, 1923.

1,452,647

UNITED STATES PATENT OFFICE.

CHARLES M. MEAD, OF LOS ANGELES, CALIFORNIA.

SAFETY SIGNAL FOR VEHICLES.

Application filed May 17, 1921. Serial No. 470,407.

*To all whom it may concern:*

Be it known that I, CHARLES M. MEAD, a citizen of the United States, residing at Los Angeles, in the county of Los Angeles and State of California, have invented a new and useful Safety Signal for Vehicles, of which the following is a specification.

This invention is applicable to various uses and is particularly intended for the use of automobile drivers for the purpose of warning the road passengers at front and back, of the intention to turn to one or the other side to go ahead or stop.

An object of the invention is to provide a cheap, simple and effective device of this kind, which can be easily applied to vehicles of the character indicated and which will be under the control of the driver to give the required signal.

A further object is to provide a device of this character to indicate both at the front and at the rear of the vehicle; and an object in this respect is to construct a unitary attachment of rigid character that may be adjusted to and clamped onto the supports by which it may be mounted on the vehicle.

The invention is broadly new, basic and pioneer in that I provide at both the front and rear of a vehicle, a revolvable tumbler having various longitudinal and inclined faces thereof that are provided with signals, and means for revolving the tumbler to expose the faces separately and to simultaneously expose corresponding signals at both the front and rear of the vehicle.

In practice I prefer to apply two such tumblers to the machine and to connect them by suitable means to an oscillating lever by which they are simultaneously turned to expose corresponding signals, the sight face of said tumblers being directed oppositely.

Another object of the invention is to provide for adjustably mounting the appliance on a vehicle.

Other objects, advantages and features of invention may appear from the accompanying drawings, the subjoined detail description and the appended claims.

The accompanying drawings illustrate the invention.

Figure 1 is a perspective view of my invention mounted upon an automobile, fragments of which are shown; illustrating its appearance to a person in front and to the left hand side; also indicating that the automobile is to turn to the right.

Fig. 2 is a fragmental perspective detached view of the signal with indicators set for a turn to the right.

Fig. 3 is a view of the appliance with front signal set for turn to the right.

Fig. 4 is a like view of the rear signal arranged to turn to the right.

Fig. 5 is an enlarged fragmental view of the front gear mechanism detached from the appliance.

Fig. 6 is an enlarged section on line $x^6$, Fig. 2.

Fig. 7 is a fragmental section on line $x^7$, Fig. 6.

Fig. 8 is an enlarged view of the swivel employed for attaching the appliance to the bows of an automobile.

Fig. 9 is a section on line $x^9$, Fig. 8.

Fig. 10 is an enlarged fragmental section on line $x^{10}$, Fig. 3; showing a modified form of tumbler mounted in the indicator boxes.

Fig. 11 is a perspective view of a modified form of tumbler detached.

Fig. 12 is a developed face view of the tumbler shown in Fig. 11.

Fig. 13 is a developed face view of the forward tumbler shown in Figs. 1 and 7.

Fig. 14 is a developed face view of the rear tumbler shown in Figs. 1 and 7.

The appliance comprises a frame 1 consisting of a shaft housing 2 to which are attached the forward and rear signal boxes 3, 4 respectively.

Shaft housing 2 consists of forward and rear pipes 5, 6 that are secured to a coupling 7; and adjustably mounted on pipes 5, 6 are swivel clasps 8, 9, by which the appliance 1 is secured to the bows 10 of a vehicle top 11.

The swivel clasps 8, 9 are adjustable on pipes 5, 6 to move them adjacent the forward and rear bows 10 of the vehicle top 11; and are swiveled so that one member of these clasps are adjustable to conform to the inclined position of the bows 10.

Signal boxes 3, 4 can be attached to shaft housing 2 by any well known means; as shown, ends 12, 13 of pipes 5, 6 are journaled into the rear wall of the signal boxes;

and are secured therein by means of angle plates 14 that are connected to pipes 5, 6 by clasps 15 and to boxes 3, 4 by screws 16.

In the signal boxes 3, 4 are mounted oscillating tumblers 17, 18 with signal faces on which are printed or attached the subject matter as at $s$, to indicate the vehicle driver's intentions to turn to the right or left, go straight ahead or stop, or other indications that are an aid to the driver to forewarn other drivers and pedestrians of his intentions.

The tumblers 17, 18 can have as many faces as desired; that is four, six, or more, on which subject matter is printed or attached. So that by selectively turning the tumblers the driver can turn, stop or start.

Signal boxes 4, 5 have open sides 3', 4' for exposing any of the predetermined faces of the tumblers 17, 18; and these tumblers are revolvably mounted in the signal boxes 3, 4 on spindles 19, 20. Secured to spindles 20 are the bevel gears 21 that mesh with the mutilated bevel gears 22 secured to the ends of rock shaft 23 in shaft housing 2.

Coupling 7 is cut away at 24 to form a clearance for the mounting and movement of lever 25 that is secured to and adapted to actuate rock shaft 23, by which means the tumblers are turned to simultaneously expose a predetermined face to the front and rear of the vehicle to which the appliance is attached.

A sector 26 is attached to pipe 6 and provided with notches 27 that are adapted to receive and hold the spring finger 28 on lever 25; and the notches 27 are arranged on the sector 26 to correspond to the position of the faces on the tumblers 3, 4; that is as lever 25 is moved from notch to notch predetermined and corresponding faces of the tumblers 17, 18 are visually exposed.

Lever 25 is preferably arranged relative to other parts of the appliance so that it is above the steering post 29 of the vehicle 30 and within easy reach of the driver so that he can operate the lever 25 to move the tumblers into position to indicate his driving intentions. While I show a lever for actuating rock shaft 23 and associated parts I do not desire to be limited to that specific construction as the shaft can be operated in various ways well known to mechanics.

As previously stated the tumblers can have as many faces as desired, spaced equidistant around their axes. In Figs. 1–7, 13, and 14, I show four sided tumblers with a single face on each side; and in Figs. 10–12 I show four sided tumblers with each side provided with three faces $a$, $b$, $c$.

The center faces $a$ are parallel to the axes of the tumblers and the end faces $b$, $c$ are oblique to said center face. That is to say, they angle or incline inward from faces $a$ toward the tumbler axes; and the purpose of the inclined faces $b$, $c$ is to make them clearly visible to persons observing the sides of the vehicle.

When the tumblers are four sided I prefer to print or attach the sign words Left, Ahead, Right and Stop to the respective faces as shown in the drawings with arrows indicating to persons in front or rear of the vehicle the turning directions. These arrows are desirable, especially on the front indicator; as the right and left to the vehicle driver differs from the right and left to a person facing the driver.

In operation the driver signals his intentions to turn to right or left, stop or go ahead by actuating lever 25 to rotate the tumblers 17, 18 into position that will indicate to persons in front or rear exactly what he intends to do; and the signals can be set some time before he actually turns, stops or goes on ahead.

Also the notched sector plate 26 holds the lever 25 securely in place after the tumblers are moved to a predetermined position so that the driver can release lever 25 and give all of his attention to operating the vehicle; thereby enabling him to drive with greater safety.

Also great safety is assured to pedestrians and also to vehicle drivers by means of this safety signal which positively and unmistakably indicates the intentions of the vehicle driver, so that others can guard against those accidents that are now so common on account of mistaken signals.

I have shown my safety signal adapted to a vehicle of left hand drive, but it is understood that by reversing the tumblers and rocker shaft housing that my appliance can be attached to a vehicle with a right hand drive.

I claim.

1. A safety signal for vehicles comprising front and rear signal boxes; tumblers revolvably mounted in the front and rear signal boxes having center faces parallel to the axes of the tumblers and other faces inclining from the center faces toward the tumbler axes; a shaft housing connecting said boxes; a rock shaft in said housing; means connecting said shaft and said tumblers; a sector attached to said housing and having notches; a lever for actuating said rock shaft to move said tumblers; and means on said lever adapted to engage the notches on said sector to hold the tumblers in predetermined positions.

2. A safety signal for vehicles comprising front and rear signal oscillating tumblers having parallel center faces and end faces oblique to said center faces, and means for oscillating said tumblers for the purpose specified.

3. A safety signal for vehicles comprising front and rear signal boxes, tumblers having parallel center faces and end faces oblique to said center faces, said tumblers being revolvably mounted in the signal boxes, and means for oscillating said tumblers for the purpose specified.

4. An oscillating tumbler for vehicle safety signals having parallel center faces and end faces oblique to said center faces.

5. A safety signal for vehicles comprising front and rear signal boxes that each have an open side, tumblers revolvably mounted in the signal boxes, and provided with faces that are parallel to the axes of said tumblers and having thereon signals to indicate a driver's intentions, a shaft housing connecting said front and rear signal boxes, means for rotating said tumblers to expose separately through the open sides of said signal boxes any predetermined signal on the faces of said tumblers and swivel clasps on the shaft housing for securing said frame to the front and rear bows of a vehicle top substantially as described.

6. A safety signal for vehicles comprising a frame, front and rear tumblers revolvably mounted in the frame, said tumblers having center faces parallel to the axes of said tumblers and other faces inclining inward from the center faces toward the tumbler axes, and means for rotating said tumblers for the purpose specified.

7. A safety signal for vehicles comprising a frame, front and rear tumblers revolvably mounted in said frame and having faces on which are signals to indicate a driver's intentions, means for rotating said tumblers so that predetermined faces with their signs are visible from the front and rear of the vehicle, and swiveled clasps for attaching said frame to the bows of a vehicle top.

8. A safety signal for vehicles comprising a frame consisting of front and rear signal boxes; a shaft housing connecting said boxes, a rock shaft in the shaft housing, oscillating front and rear tumblers mounted in the front and rear signal boxes, means connecting said shaft and said tumblers, means for rocking said shaft to actuate said tumblers, and swivel clasps for attaching said frame to the front and rear bows of a vehicle top.

9. A safety signal for vehicles comprising a frame consisting of front and rear signal boxes, a shaft housing connecting said boxes, a rock shaft in said housing, front and rear tumblers mounted in the front and rear signal boxes, a bevel gear connection between said rock shaft and said tumblers to turn the tumblers; a lever for moving said rock shaft, and swivel clasps on the shaft housing for securing said frame to the front and rear bows of a vehicle top substantially as described.

10. A safety signal for vehicles comprising front and rear signal boxes that each have an open side; tumblers revolvably mounted in the signal boxes said tumblers having faces with signals to indicate a vehicle driver's intentions; a rock shaft housing connecting the front and rear signal boxes; a rock shaft in said rock shaft housing; a bevel gear connection between said tumblers and said rock shaft; a hand lever for actuating said rock shaft to move said tumblers to expose simultaneously at front and rear of the vehicle corresponding signals, and means for detachably connecting said rock shaft housing to a vehicle.

11. A safety signal for vehicles comprising a unitary attachment for vehicle tops with a front and rear signal indicating appliance, and swiveled clips for securing the unitary attachment to a vehicle top substantially as described.

12. A safety signal for vehicles comprising a shaft extending along the side of a vehicle top; means to secure said shaft to the vehicle top near the upper part of said top; tumblers at right angles to said shaft and provided with direction indicators on different sides; a lever extending from the shaft to be operated by the driver of the vehicle; and means operatable by the shaft to selectively turn the tumblers to expose the required direction indicator.

13. A safety signal for vehicles comprising front and rear signal boxes; tumblers revolvably mounted in the front and rear signal boxes having center faces parallel to the axes of the tumblers and other faces inclining from the center faces toward the tumbler axes; a shaft housing connecting said boxes; a rock shaft in said housing; means connecting said shaft and said tumblers; a sector attached to said housing and having notches; a lever for actuating said rock shaft to move said tumblers; means on said lever adapted to engage the notches on said sector to hold the tumblers in predetermined positions; and swiveled clasps on said housing for securing said frame to the front and rear bows of a vehicle top substantially as described.

In testimony whereof, I have hereunto set my hand at Los Angeles, California, this 7th day of May, 1921.

CHARLES M. MEAD.

Witness:
JAMES R. TOWNSEND.